UNITED STATES PATENT OFFICE.

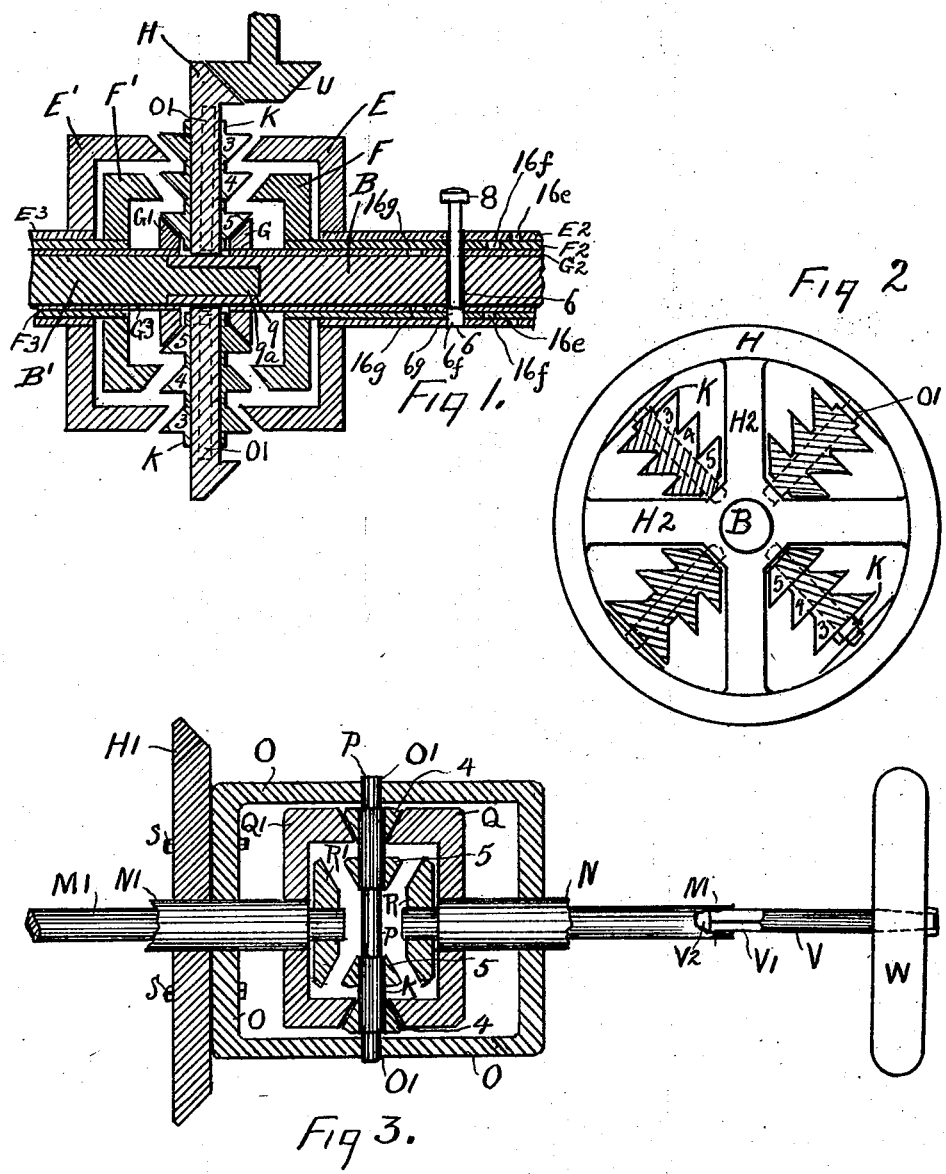

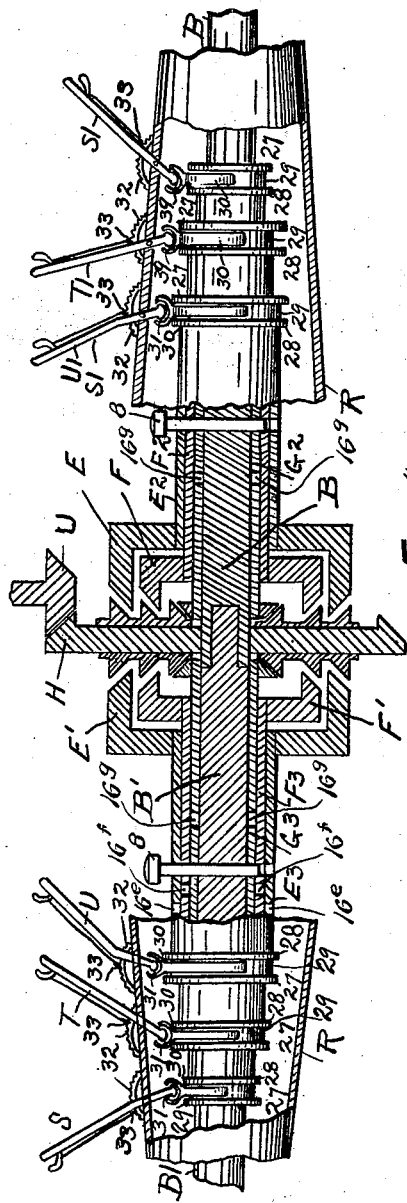

JACOB FRANKLIN NISEWANGER, OF TRANQUILLITY, CALIFORNIA.

DIFFERENTIAL FOR VEHICLES.

1,418,452. Specification of Letters Patent. Patented June 6, 1922.

Application filed April 17, 1919. Serial No. 290,793.

*To all whom it may concern:*

Be it known that I, JACOB FRANKLIN NISEWANGER, a citizen of the United States, and a resident of Tranquillity, in the county of Fresno and State of California, have invented a new and useful Improvement in Differentials for Vehicles, of which the following is a specification.

My invention relates to differentials in vehicles in which the motive power is transmitted through shafts carrying traction wheels, such shafts being divided into two parts and means whereby the differential can be adjusted so that one part of the shaft can have a more positive pulling power than the other part of the shaft.

The primary object of my invention is to produce a differential adapted to transmit power to a shaft divided into two parts wherein the driving power can be applied to a greater degree on one side than the other, wherein the division of the power as between the shafts can be varied at the will of the operator, and more in detail the application of these objects is to permit the wheel on one end of the shaft or axle to have a greater traction power than its mate, so that the pull of the tractor can be placed nearer the wheel having the greater traction power. And in cases where it is proposed to drive the front and rear wheels with a differential between them, adjustments may be had whereby the driving power applied to one set of wheels can be greater than what is applied to the other set. Other objects will be hereinafter disclosed.

These are accomplished by means of the device illustrated in the enclosed drawing in which Figure 1 shows a sectional view of the differential complete. Figure 2 shows the assembly of the master gear and intermediate gears partly in section. Figure 3 is a view of a modified form of differential partly in section, showing a floating axle carrying a driving wheel, which permits of lateral adjustments. Figure 4 shows a sectional view of the differential gears, a part sectional view of portions of the rear axle housing, and means for shifting the differential gears.

In said drawing (Figure 1) B and $B^1$ are two halves of the driving axle which are joined together by means of socket 9 in the end of axle B, and an inset $9^a$ on the end of axle $B^1$. Inset $9^a$ has a running fit within socket 9. H is a master gear rotatable on shaft B where joined to shaft $B^1$. $G^2$ is a sleeve having a sliding fit on shaft B, and attached thereto is a driving gear G. $G^3$ is a sleeve fitted to a sliding fit on shaft $B^1$, and has bevel driving gear $G^1$ attached thereto. Driving gears G and $G^1$ are the same size. $F^2$ and $F^3$ are sleeves having a sliding fit on the outside of sleeves $G^2$ and $G^3$, and each carries a cup-shaped uniform-size driving gear F and $F^1$. $E^2$ and $E^3$ are sleeves having a sliding fit on sleeves $F^2$ and $F^3$ and carry cup-shaped uniform-size driving gears E and $E^1$. These sleeves may be cylindrical or angular in shape.

The wheel H has a plurality of spokes $H^2$. Between the spokes wheel H carries a plurality of radially disposed shafts $O^1$, on each of which a sleeve K has a running fit. To the sleeve K are rigidly attached a plurality of uniform-sized pinions which are used as intermediate pinions in the differential. In Figure 1 I have shown three pinions which are identified as 3, 4 and 5, and in Figure 3 I have shown but two, indicated as 4 and 5. The relation of the gears described are that the driving gears G and $G^1$ are adapted to mesh with pinions 5, driving gears F and $F^1$ are adapted to mesh with pinions 4 and driving gears E and $E^1$ are adapted to mesh with pinions 3. By means of the sliding sleeves $G^2$ and $G^3$, $F^2$ and $F^3$, $E^2$ and $E^3$ these driving gears and intermediate pinions can be enmeshed or disengaged and different combinations may be formed whereby the larger driving gears on the one side may be enmeshed with one of the intermediate pinions attached to sleeve K, and a smaller driving gear on the other side enmeshed with a pinion on sleeve K, thus making the pulling power on the shafts B and $B^1$ unequal. It should be noted that the driving gears F, $F^1$, E and $E^1$ are formed cup-shaped so that the smaller gears can be disengaged from the pinions on sleeve K by being slid into the cup portion of the larger wheels, while the larger wheels can be enmeshed with the pinions on sleeves K.

I have placed a series of holes through the sleeves described for the purpose of locking the sleeves carrying the driving gears by means of a pin 8 in any combination which may be selected. The hole through the axle is designated as 6 and the other holes as hereinafter referred to. When hole 6 registers with holes $6^g$ in sleeve $G^2$, with hole $6^f$ in sleeve $F^2$, and with hole $6^e$ in sleeve $E^2$, the driving gear G will be in mesh with pinions 5 and driving gears F and E will be idle. If under those conditions the driving gear G¹ is also enmeshed with pinion 5, the pulling power applied to shafts B and B¹ are approximately equal.

When hole 6 registers with hole 16ᶠ on sleeve F², with hole 16ᵍ in sleeve G², and with hole 6ᵉ in sleeve E², the driving gear F will be in mesh with intermediate pinion 4, and the gears G and E will be idle. Under this adjustment, if driving gear G¹ is enmeshed with intermediate pinion 5, a greater traction power will be transmitted to shaft B than to B¹. When hole 6 registers with hole 16ᵉ, in sleeve E², and with holes 16ᵍ and 6ᶠ, the driving gear E will be in mesh with intermediate pinion 3 and gears G and F will be idle. Driving gears G¹ and F¹ and E¹ can be adjusted in the same manner as gears G, F and E herein described. It should be noted that no special claim is made herein for the device for shifting the sleeves described. Any of the usual devices for shifting gears and locking them in selective relations can be applied to and used in the shifting of the driving gears above described. U is a pinion for driving master gear H.

In Figure 3 I have shown another form of differential in more common use in which the same principle of unequal sized driving gears being used is involved. In said Figure 3, O is a differential box carrying shafts O¹ on which sleeves K are disposed to rotate. Sleeves K carry intermediate pinions 4 and 5 which are attached thereto. M and M¹ are shafts having a common center line, each of which have an end within the box O. Shaft M has attached thereto within box O a driving gear R which meshes with pinions 5, and shaft M¹ has attached thereto driving gear R¹ which also meshes with pinions 5. N and N¹ are sleeves fitted to slide on shafts M and M¹. Sleeves N and N¹ each carry a cup-shaped driving gear Q and Q¹ of uniform size, gears Q and Q¹ are adapted to mesh with intermediate gears 4 and by sliding the sleeves N and N¹ gears Q and Q¹ and intermediate pinions 4 can be disengaged. The sliding of the sleeves N and N¹ and sliding shafts M and M¹ and locking them in selective positions can be done in any suitable manner.

H is a master gear attached to box O by means of screws S. V is a shaft to which traction wheel W is attached. I have shown shaft V ending in a squared shank which enters a corresponding socket V² in the end of shaft M. Socket V² is long enough to permit a lateral adjustment of shaft M without moving shaft V.

In Figure 4 I have shown means for selectively meshing the driving gears with the pinions. In said drawing each of the axle shafts having a driving gear attached to the inside end thereof, terminates with an outside flange 27, and has a collar 28 parallel with the flange and a spaced distance therefrom, thus forming an annular groove 29. 30 is a yoke adapted to rotatingly fit around the groove 29. S, S¹, T, T¹, U and U¹ are levers pivoted to the housing R, and connecting with yoke 20 by means of a ball and socket joint 31. 32 are curved ratchets and 33 are dogs pivoted to the levers referred to and are adapted to lock the levers to the ratchets for the purpose of holding the driving gears in the desired relation with the pinions.

I claim as new and ask for Letters Patent upon:

1. In a differential, the combination of an axle consisting of a plurality of shafts having a common axis, said axle being divided into two parts which are spaced apart, a master gear adapted to rotate independent of said axle and concentric therewith, a plurality of pinion shafts mounted radially in the master gear and adapted to rotate with the master gear, bushings adapted to rotate on the pinion shafts, and a plurality of uniform-size pinions rigidly attached to the bushings, a driven gear attached to each part of each shaft, some of said driven gears being formed cup shaped so that the next smaller gear can be slid within the cup beyond the plane of the teeth of the next larger gear, each of said driven gears being adapted to mesh with one of the pinions on each of the bushings, together with means for selectively meshing one of the driven gears on each of the two parts of the axle with the intermediate pinions, and for locking the shafts in such relation.

2. In a differential, the combination of an axle consisting of a plurality of shafts having a common center line, said axle being divided into two parts which are spaced apart, a master gear adapted to rotate independent of said axle and concentric therewith, a plurality of pinion shafts in line with radius lines of said master gear, bushings rotatable on the pinion shafts, a plurality of uniform sized intermediate pinions rigidly attached to each of said bushings and arranged so that each set of pinions are equidistant from the center of the master gear, a driven gear attached to each shaft forming the axle, each driven gear being adapted to mesh with pairs of intermediate gears, together with means for selectively meshing two of the driven gears on opposite sides of the intermediate gears with pairs of the intermediate pinions, and for locking the shafts in such relation, substantially as described.

JACOB FRANKLIN NISEWANGER.

Witnesses:
  HERBERT A. HUEBNER,
  A. A. HUEBNER.